Jan. 12, 1971   D. H. PINER, JR   3,553,940
PRECIPITATOR
Filed Jan. 30, 1969   2 Sheets-Sheet 1

INVENTOR.
DICK H. PINER JR.
BY Arthur L. Wade
ATTORNEY

INVENTOR.
DICK H. PINER JR
BY Arthur L Wade
ATTORNEY

United States Patent Office 3,553,940
Patented Jan. 12, 1971

3,553,940
PRECIPITATOR
Dick H. Piner, Jr., New Orleans, La., assignor to Combustion Engineering, Inc., New York, N.Y., a corporation of Delaware
Filed Jan. 30, 1969, Ser. No. 795,244
Int. Cl. B01d 19/00
U.S. Cl. 55—174                                    6 Claims

ABSTRACT OF THE DISCLOSURE

A vessel has a media pack, which functions as a coalescing and filtering body, arranged in a plane extended at an angle to the horizontal. The produced fluids of an oil well are directed to flow up through the pack for coalescence of emulsified oil and filtering of entrained solids. The lighter fluids then ascend to the top of the vessel for removal. The heavier fluids are removed from a collecting volume in the bottom of the vessel.

BACKGROUND OF THE INVENTION

(1) Field of the invention

The present invention relates to the cleaning of oil field waters associated with oil production by separating oil remaining in the water after the initial field processing of the oil. More particularly, the invention relates to agglomerating or coalescing the oil particles dispersed through the water with a body of coalescing material which is extended in a plane and arranged to provide lengthy exposure of the oil and water mixture to the body. The invention also provides for an improved handling of solid material entrained in the fluids.

(2) Description of the prior art

Generally, oil well production has a substantial amount of water in its composition. A portion of this water may be emulsified with the accompanying oil. The portion of the water not emulsified (commonly called the "free" water) will settle and separate from the oil and water/oil emulsion if given sufficient residence time. It is common practice to provide vessel capacity in the initial stages of field processing to separate the oil and water which are not emulsified. Vessels or portions of vessels provided for this separation step are termed "free water knock-outs."

The nature of the oil and water mixture may be such that significant amounts of oil will be discharged from the free water knock-out along with the free water. Also, a measure of solid material, generally referred to as "sand" but actually of silt and colloidal particle size, may also be swept along with the free water. Therefore, the output product of the free water knock-out may be a mixture of oil, water and solids which, due to its contamination capacity, cannot be disposed of. It is noted for completeness' sake that this contamination problem may also develop following later field processing steps. A second vessel is needed when this contamination problem exists to separate the solids from the liquids and the residual amounts of oil from the water. This oil may, or may not, be economically recovered as a separate product flowing from this vessel; the gas evolved may be small in quantity and value. However, the basic requirement that the water be cleaned of enough foreign constituents to make possible its disposal must be met in this second vessel.

It is obvious from the prior art that lengthy residence time will solve most of this water contamination problem. The oil particles will eventually rise to the surface and the solid particles will eventually sink to the bottom. However, a coalescing body is required to reduce the time to coalesce the oil so it will rise more quickly and thus minimize the vessel size and cost. The coalescing body should be positioned to obviate the solid particles settling within it. Finally, the coalescing body should be placed to utilize the force of gravity in replacing it.

SUMMARY OF THE INVENTION

A principal object of the invention is to flow oil field water having drops of oil dispersed therein in an improved manner upward through a coalescing and filtering body which agglomerates the oil into drops large enough to quickly rise to the surface, leaving the water to be removed for disposal.

Another object is to mechanically arrange the coalescing body to effect improved filtering of entrained solids so that they less readily settle in and plug the coalescing media.

Another object is to arrange the coalescing body so the force of gravity is inherently utilized to remove and replace it.

The present invention contemplates a vessel in which a media pack of excelsior, or similarly suitable material, is mounted so oil field water will flow up through the pack to outlets for the water and coalesced oil on the downstream side of the pack. The pack is generally arranged in a plane or uniform thickness. The plane is at an angle to the horizontal, and therefore the liquids travelling vertically upward flow through the pack a distance materially greater than the thickness of the pack. Solid particles such as silt either fall vertically downward against the upward flow of liquids and collect on the bottom of the vessel and outside the pack, or are filtered and lodge within the pack. The oil particles dispersed in the water coalesce as they flow through the pack and rise to the top of the vessel for separate removal. The decontaminated water is withdrawn from the downstream side of the pack at a point well removed from the oil withdrawal.

Access manways are provided in the walls of the vessel, above and below the pack. The pack can be removed from the lower manway and a replacement made through the upper.

Other objects, advantages and features of the invention will become apparent to one skilled in the art upon consideration of the specification, claims and drawings attached, wherein:

DESCRIPTION OF THE PREFERRED EMBODIMENT

The operating situation

Following any of the various separation and treatment steps performed on a well stream during the field processing of oil well production, it is common to encounter residual amounts of oil and entrained solids of silt or even smaller grain size (commonly called "basic sediment") in the associated free water initially separated from the produced oil. Such residual amounts in excess of approximately 50 p.p.m. are removed in equipment of the general type set out in the preferred embodiment of the invention. In oil field parlance, this type of process vessel is usually referred to as a "precipitator."

The structure of the embodiment

Figure 1:
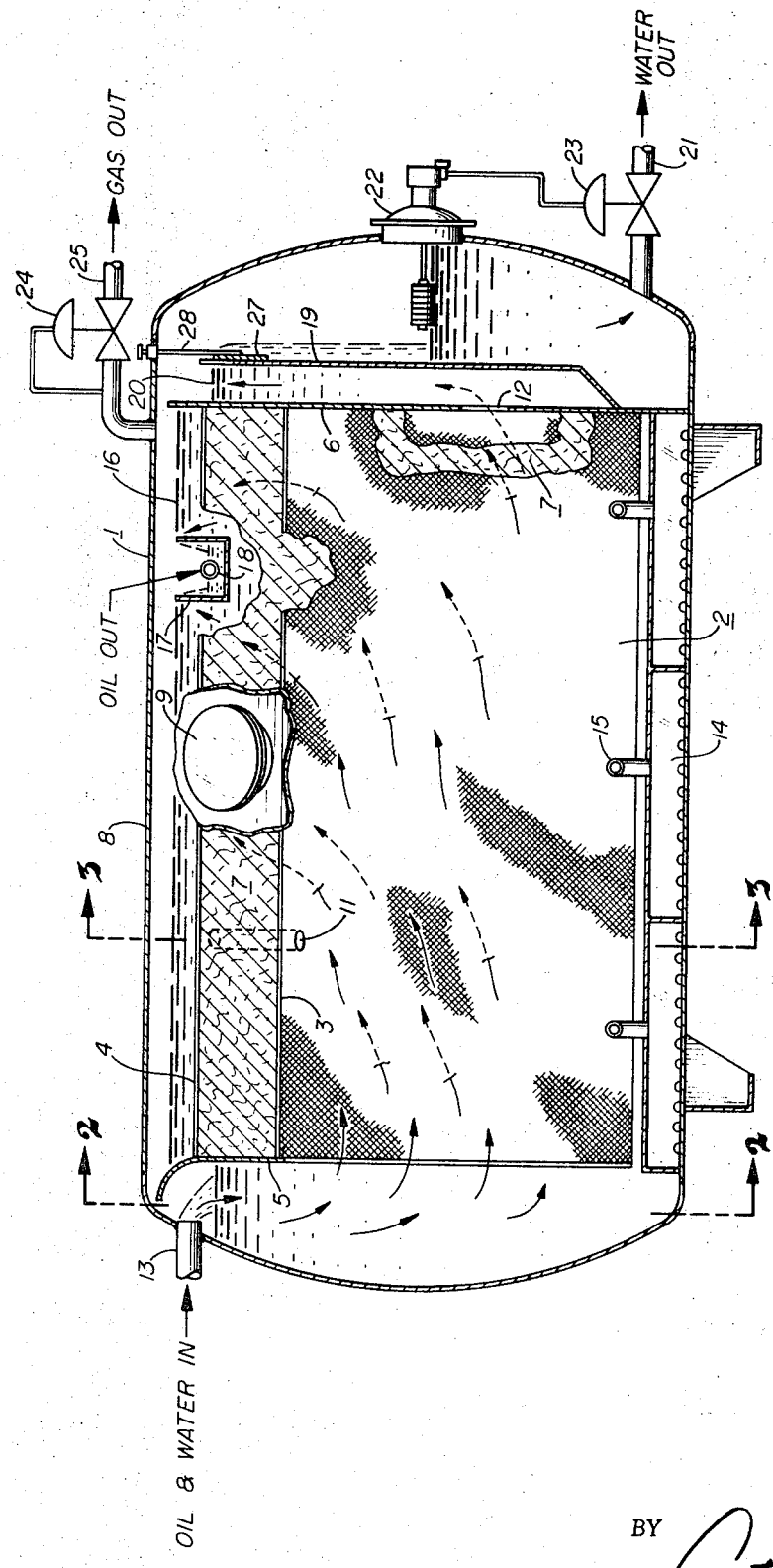
FIG. 1 is a cross-sectioned elevation of a vessel embodying the invention and showing the coalescing section inclined from top to bottom away from the viewer.

The drawing of FIG. 1 discloses how the precipitator embodying the invention enhances the solution to the problem of oil and basic sediment removal from an associated water stream. The basic vessel 1 of the precipitator is cylindrical, the view being a cross-section in elevation.

The operative element of vessel 1 is coalescing and filtering structure 2. This body 2 is comprised of lower and upper grid supports 3, 4, and is defined at its ends by plates 5, 6. Plates 5, 6 are a part of a chamber within vessel 1 in which body 2 is contained. The coalescing and filtering media of body 2 is represented by packing 7 shown occupying the volume between grids 3, 4. The top and bottom definition for packing 7 is the portion of the vessel wall 8 intersected by grids 3, 4. The final necessary features of structure 2 are the two manways 9, 10 seen more clearly in FIGS. 2 and 3 by which the interior of 2 is accessible from external the vessel. Pressure equalization between the upstream and downstream sides of media 7 is usually provided by at least one bypass port 11 or similar structure. Finally, a cutout is made in plate 6, shown in FIG. 3 at 12, on the downstream side of grid 4 to provide a flow path for the decontaminated water to exit the coalescing section 2 and the vessel itself.

Structure-function relationship

Of course, various of the elements of structure 2 have both structural and functional purposes. Grids 3, 4 serve both as structural support for media 7, and as conduit means to allow the fluids to pass into, through and out of the media during their flow through the vessel. It is seen that grids 3, 4 may take various forms within the inventive concept; they might, for instance, be formed of steel plate in which a suitable number of holes are drilled or punched.

Likewise, end plates 5, 6 serve to define the volume of the chamber within which coalescing and filtering occur and the lengthwise extent of media 7, an act as baffling structures which direct the flow of fluids through the vessel 1. Fluids enter the vessel through conduit 13 and are deflected by impingement upon the upper portion of plate 5. This plate will absorb the momentum of the fluids and promote further evolution of solution gas from the oil by agitation of the oil.

Figure 2:
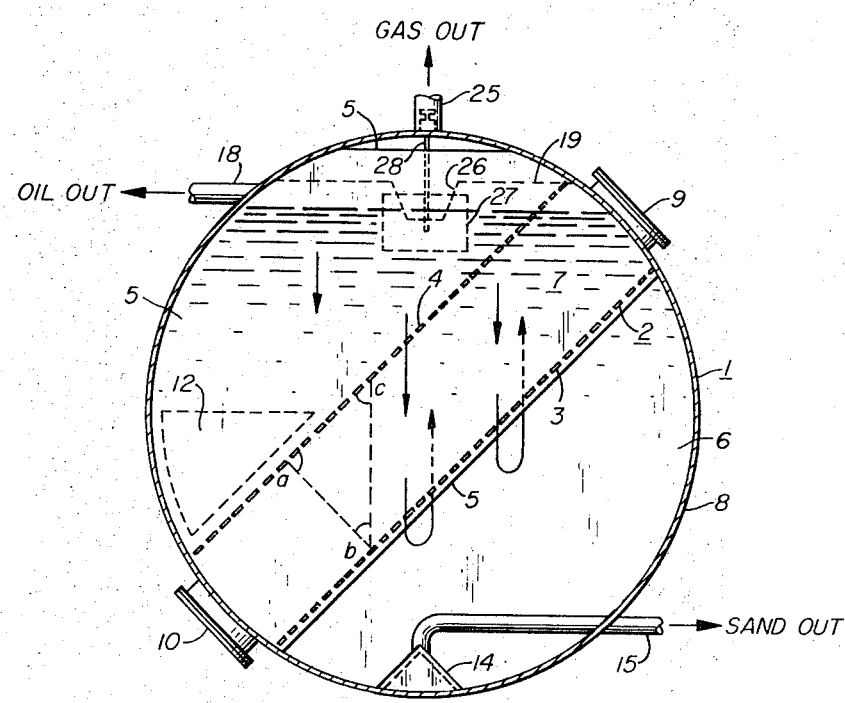
FIG. 2 is an end view elevation of the vessel of FIG. 1 viewed along section 2—2.

These fluids are then directed around plate 5 and beneath structure 2 where they percolate upwardly through the media 7. FIG. 2 illustrates most clearly these two steps. Some of the entrained solids will settle from the fluid as the flows flow around baffle 5, and others will be trapped with the interstices of the media 7. This sediment material is collected in so-called "sand pans" 14 and drawn from the vessel periodically through conduits 15.

The flow pattern

As the fluids percolate through media 7, the droplets of oil in an emulsified state in the water of the stream are coalesced by mechanical interaction with the media. This is a well known phenomenon in the art and not detailed here. A common media used to separate an oil/water emulsion is excelsior. Coalesced oil which exits the downstream side of media 7 rises to the fluid surface 16 and forms a layer which is removed after overflow into spill box 17 through conduit 18.

Figure 3:
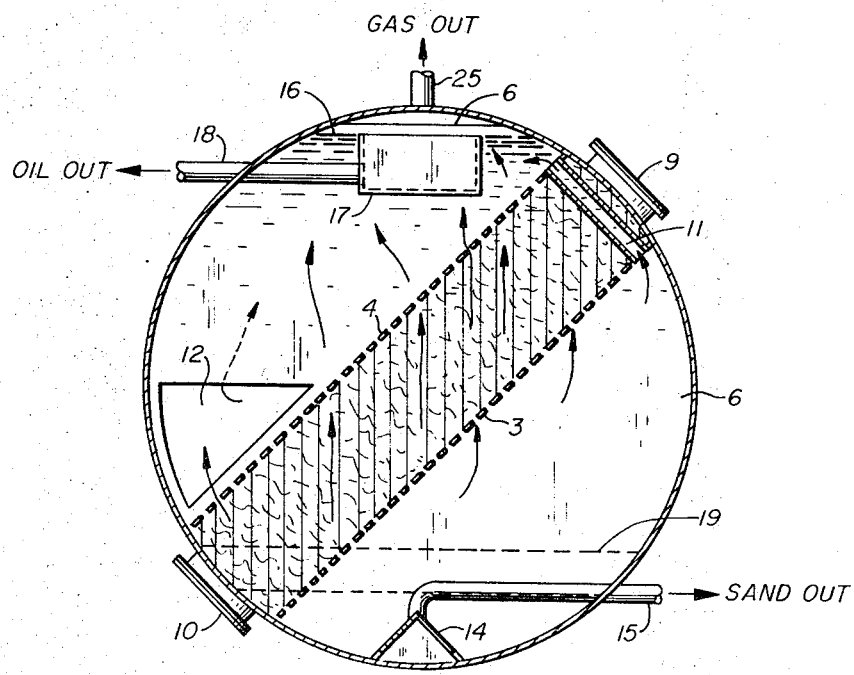
FIG. 3 is an end view elevation of the vessel of FIG. 1 viewed along section 3—3.

Clean water exits the collection volume immediately downstream of element 2 through the wedge-shaped cutout 12 in end plate and baffle 6. The baffling function of plate 6 is now clear, and is illustrated in FIG. 3. The openings above all baffles in vessel 1 insure liquid level control and pressure equalization in the several vessel compartments.

The decontaminated water moving through cutout 12 in plate 6 is directed by baffle 19 into the siphon or "water leg" formed by baffle 19. The function of the head of liquid at 20 in this leg is control of the height of the liquid level 16 in the coalescing and filtering chamber. The water then falls from level 20 into the final collection volume of the vessel, and is drawn off through conduit 21. A level control apparatus 22 and diaphragm operated valve 23 are shown for control of conduit 21. Similarly, a back pressure valve 24 to control the working pressure within the vessel is shown in the gas discharge conduit 25.

It is stressed that level 20 is adjustable in this embodiment of the invention. This is necessary to accommodate variations in the oil/water ratio, oil gravity, and other variables of the fluids subject to treatment. This requirement should be clearly appreciated from understanding of the level 20 control function upon level 16, viz that the hydrostatic head due to the oil plus the hydrostatic head due to the water in the structure 2 compartment equals the hydrostatic head due to the water in the siphon of baffles 6, 19.

An adjustable weir structure is depicted in FIG. 2 to regulate level 20 and is shown comprised of a notch 26 cut in plate 19, a gate 27 in water-tight engagement with and slidably mounted on plate 19, and an actuating arm 28 extending exterior the vessel for external adjustment of the position of gate 27. It is noted, however, that in some certain cases the adjustable weir would not be provided; flow conditions through the precipitator would approximate steady gate and thus allow the level 20 to be determined and fixed at the time the vessel was designed.

Maintenance of the media packing

A severe problem has been present with this type of treating equipment in maintaining the media 7, namely in the difficulty, and thus expense, of removing and replacing the media. The preferred embodiment in this disclosure positions the media at an angle inclined to the horizontal, and so provides a simple and convenient method to this end. When necessary to remove the media 7, the vessel is drained and manways 9, 10 are opened. A prod or ram forced through 9 effects removal of the packing. Manway 10 then is closed and new media is packed to a desired density through manway 9. This seemingly simplistic arrangement of the structure 2 nonetheless achieves a significant improvement over the previously horizontally or vertically aligned structures.

Significance of inclining structure 2

The improvements due to inclination of the coalescing and filtering structure 2 are apparent from the geometry of flow pattern. The advance is twofold. Briefly and concisely stated, this arrangement permits (1) coalescence of the emulsified oil in an upward flow pattern, and (2) traverse of the fluids across the hypotenuse $bc$ of triangle $abc$ shown imposed in FIG. 2 on a portion of the coalescing media.

As to (1), it was previously believed that due to the generally small oil/water ratio (approximately $\frac{1}{100}$) in a precipitator, downflow coalescence was the only feasible technique. The instant invention has successfully employed upflow coalescence to this art. The chief advantage of the upflow pattern has been a greatly reduced tendency of the media to plug with the entrained basic sediment of the fluids being treated, and consequently longer service life of the media. Other of the several advantages long known to practitioners of the oil field "treating" art from upflow coalescence are also now available to decontamination of water with very small percentage oil-in-water emulsions by this upflow method.

As to (2), in precipitators in which the coalescing structure 2 is horizontal and flow is vertical it is seen that only leg $ab$ of the triangle $abc$ will be traversed by the fluids being treated. This would result in an emulsion retention time within the media of shorter duration than in the present invention, and thus reduce the efficiency of the coalescing body. Designs in which the media is vertical employ a horizontal flow and encounter the same result.

It is a central aspect of the inventive concept to incline the structure 2 at an angle to the horizontal in a manner such as depicted in FIG. 3. It is clearly seen that percolating fluids of the novel precipitator disclosed will travel a path generally defined by line $bc$ of the triangle $abc$ of FIG. 2. The advantage when the angle of inclination is 45° will be 1.414 to 1. It is anticipated that the inclination will usually be approximately 45° to optimize this length ratio of leg $bc$ to leg $ab$.

Conclusion

It is seen that the invention provides a unique structure and method of coalescing emulsions in which there is a small ratio of the emulsified liquid to the carrier. The preferred embodiment is directed to the problem of small percent oil/water emulsions in oil field production processing. It is further seen in the precipitator disclosed that extremely fine and colloidal suspensions of solids are broken and the solids disposed of.

This embodiment therefore combines means to decontaminate oil field associated waters of residual emulsified oil and suspended sediment in a system wherein numerous advantageous and novel features reside, including: upflow coalescence of treated fluids; reduced problems of solids plugging the filtering-coalescing media; a much simplified media cleaning and replacement method; and improved economy of construction, since the operative media occupies essentially the entire vessel.

It is stressed that the system disclosed has application outside the specific use attributed to the preferred embodiment. In addition, changes can be made to the position and extent of the elements that would certainly be within the scope of the invention. It is of primary importance only that the fluids treated pass upwardly through a coalescing and filtering media inclined to the horizontal, and that the media be externally accessible for maintenance from upper and lower positions on its containing structure.

From the foregoing it will be seen that this invention is one well adapted to attain all of the ends and objects hereinabove set forth, together with other advantages which are obvious and which are inherent to the method and apparatus.

It will also be seen that certain features and subcombinations are of utility and may be employed without reference to other features and subcombinations. This is contemplated by and is within the scope of the invention.

As many possible embodiments may be made of the invention without departing from the scope thereof, it is to be understood that all matter set forth above or shown in the accompanying drawings is to be interpreted in an illustrative and not in a limiting sense.

The invention having been described, what is claimed is:

1. A separator of solid matter and oil particles from water associated with oil field production, including,
    a vessel adapted to receive water to be treated,
    two plates positioned within the vessel to form a chamber for treatment of the water,
    a coalescing pack mounted within the chamber in the vessel on a plane having an angle to the horizontal and extending to a wall of the vessel chamber,
    a first passageway within the vessel connected to the chamber to direct the oil field water and solid matter and oil particles beneath the coalescing pack,
    volume capacity within the vessel and beneath the coalescing pack great enough to reduce the upward velocity of fluids low enough to permit solid matter to gravitate downward to the bottom of the vessel,
    a second passageway connected to the chamber within the vessel and extending from above the pack to remove the water,
    a third passageway within the vessel and extending from above the pack to remove oil coalesced from the water by the pack,
    and an outlet from the top of the vessel above the pack for removal of any gas evolved from the mixture of oil and water.

2. The separator of claim 1, including,
    external access openings through the walls of the vessel to gain access to the pack for cleaning and replacing the pack.

3. The separator of claim 1, including,
    a siphon mounted within the shell and connected to withdraw water from a low point just above the pack,
    and a compartment in the shell connected to receive the water from the siphon for controlled withdrawal from the shell.

4. The separator of claim 1, including,
    a conduit extending through the pack at its upper end to permit passage of oil which rises to the top of the pack before flowing through the pack to flow across the pack, and which equalizes the working pressure in the vessel across the pack.

5. A separator for a mixture of immiscible liquids, including,
    a vessel adapted to receive the liquids,
    a chamber formed within the vessel by the walls of the vessel and two plates positioned within the vessel,
    a body of coalescing material mounted within the chamber and oriented on a plane extended at an angle to the horizontal from one internal vessel wall,
    a first passageway within the vessel connected to the chamber to direct the liquid mixture beneath the coalescing pack,
    a second passageway within the vessel connected to the chamber and extending from the lowest portion of the chamber above the pack to remove the heavier of the liquids,
    and a third passageway within the vessel and extending from the upper portion of the chamber above the pack to remove the lighter of the liquids.

6. The separator of claim 5, including,
    at least one access opening through the vessel wall of the chamber through which the coalescing material may be reached for service and replacement.

References Cited

UNITED STATES PATENTS

| | | | |
|---|---|---|---|
| 3,389,536 | 6/1968 | Bull | 55—175X |
| 3,312,044 | 4/1967 | McCarter | 55—176X |
| 2,710,071 | 6/1955 | Kinser et al. | 55—174X |
| 2,706,531 | 4/1955 | Lovelady et al. | 210—261X |
| 2,297,297 | 9/1942 | Walker | 55—42 |

FOREIGN PATENTS

| | | | |
|---|---|---|---|
| 863,908 | 3/1961 | Great Britain | 55—174 |

REUBEN FRIEDMAN, Primary Examiner

R. W. BURKS, Assistant Examiner

UNITED STATES PATENT OFFICE
CERTIFICATE OF CORRECTION

Patent No. 3,553,940            Dated January 12, 1971

Inventor(s) Dick H. Piner, Jr.

It is certified that error appears in the above-identified patent and that said Letters Patent are hereby corrected as shown below:

Column 6, lines 17-23 should be deleted and the followi inserted instead therefore:

3. The separator of claim 1, including,
a siphon mounted within the vessel and connected to the chamber to withdraw water from a low point just above the pack,
and a comportment in the vessel connected to the siphon to receive the water from the siphon for controlled withdrawal from the vessel.

Signed and sealed this 20th day of July 1971.

(SEAL)
Attest:

EDWARD M. FLETCHER, JR.
Attesting Officer

WILLIAM E. SCHUYLER, J
Commissioner of Patent